US005612266A

United States Patent [19]

Delvaux et al.

[11] Patent Number: 5,612,266
[45] Date of Patent: *Mar. 18, 1997

[54] DECORATIVE, NON-COMBUSTIBLE SYNTHETIC FIRE-LOG

[75] Inventors: Pierre Delvaux, Bromptonville; Normand Lesmerises, Rock Forest; Marcel Gouin, Deauville, all of Canada

[73] Assignee: Cerminco Inc., Sherbrooke, Canada

[*] Notice: The term of this patent shall not extend beyond the expiration date of Pat. No. 5,360,771.

[21] Appl. No.: 619,336

[22] Filed: Mar. 21, 1996

[30] Foreign Application Priority Data

Mar. 21, 1995 [CA] Canada ................................. 2145135

[51] Int. Cl.⁶ ............................ C04B 35/03; C04B 16/08; C04B 38/08
[52] U.S. Cl. ............................ 501/123; 501/80; 106/672; 106/676; 106/677
[58] Field of Search ............................ 501/123, 80; 106/672, 106/676, 677

[56] References Cited

U.S. PATENT DOCUMENTS

| | | | |
|---|---|---|---|
| 678,346 | 7/1901 | Mettler et al. | 44/520 |
| 734,743 | 7/1903 | Paul | 44/577 |
| 764,526 | 7/1904 | Gama | 44/573 |
| 3,148,996 | 9/1964 | Vukasovich et al. | 106/672 |
| 3,989,534 | 11/1976 | Plunguian et al. | 106/675 |
| 4,179,269 | 12/1979 | Yates et al. | 44/535 |
| 4,207,113 | 6/1980 | Yoshino et al. | 501/84 |
| 4,333,738 | 6/1982 | Schrader | 44/576 |
| 5,033,721 | 7/1991 | Gnyra | 501/123 |
| 5,118,538 | 6/1992 | Escher et al. | 428/1 |
| 5,118,539 | 6/1992 | Sebby et al. | 428/15 |
| 5,271,888 | 12/1993 | Sinsley | 264/87 |
| 5,360,771 | 11/1994 | Delvaux et al. | 501/80 |
| 5,362,690 | 11/1994 | Delvaux et al. | 501/95 |
| 5,393,472 | 2/1995 | Shaw | 501/123 |

FOREIGN PATENT DOCUMENTS 2059753  7/1993  Canada .

*Primary Examiner*—Mark L. Bell
*Assistant Examiner*—Louis M. Troilo
*Attorney, Agent, or Firm*—Foley & Lardner

[57] ABSTRACT

Disclosed is a decorative, non-combustible, synthetic fire-log for use in a gas or oil burning fireplace or stove. This synthetic fire-log has a density ranging from 15 to 45 lb/pi³. It is made by pouring a mineral foam into a mold shaped as a natural wood-log and letting this foam harden in the mold to form the synthetic fire-log prior to unmolding the same and letting it dry. The foam that is used for such a molding comprises 1 part by weight of a solution of phosphoric acid in which polyvinyl alcohol is dissolved in such an amount as to make the solution viscous; from 0.03 to 6 parts by weight of wollastonite containing from 0.5 to 4% by weight of a carbonate salt; from 0.2 to 10 parts by weight of water optionally one or more pigments to give a natural wood-like aspect to the synthetic fire-log; and, optionally also, a small amount of reinforcing glass fibers. The synthetic fire-log that is so-obtained looks like a natural wood-log and has the same glowing aspect in use. Moreover, it does not generate soot and advantageously ensures a full combustion of the gas or oil mixture fed into the fireplace or stove, thereby resulting in a substantial reduction in the amount of carbon monoxide released in the atmosphere.

7 Claims, No Drawings

DECORATIVE, NON-COMBUSTIBLE SYNTHETIC FIRE-LOG

BACKGROUND OF THE INVENTION a) Field of the Invention

The present invention relates to the use of a lightweight mineral foam like the one disclosed and claimed in U.S. Pat. No. 5,360,771 issued on Nov. 1st, 1994 with designation of the present inventors, for the manufacture of a decorative, non-combustible synthetic fire-log.

The invention also relates to the synthetic fire-log that is so-obtained and to the use of such a synthetic fire-log as a substitute for a natural wood-log in a gas-or oil-burning fireplace or stove.

b) Brief Description of the Prior Art

Synthetic fire-logs for use in fireplaces or stoves are well known products.

U.S. Pat. No. 678,346 issued in 1901 to C. W. METTLER and U.S. Pat. No. 734,743 issued in 1903 to A. PAUL both disclose synthetic fire-logs made by compression of sawdust and coal dust with a liquid binder.

U.S. Pat. No. 764,526 issued in 1904 to M. C. GAMA also discloses a synthetic fire-log made by compression of sawdust and coaldust with crude oil, residues of refined oil and tallow.

U.S. Pat. No. 4,179,269 issued in 1979 to W. L. YATES discloses a synthetic fire-log made by extrusion of a mixture of coal, wood chips and molten slack wax at a temperature of 80 to 95AF.

U.S. Pat. No. 4,333,738 issued in 1982 to J. SCHRADER discloses synthetic fire-logs made by compression of sawdust or wood chips with coal liquid, molasses and paraffin wax in appropriate quantities.

All the synthetic fire-logs disclosed in the above patents are combustible and intended to be used either in combination with or as a substitute for natural wood-logs in a conventional, wood-burning fireplace or stove.

More recently, non-combustible synthetic fire-logs have also been devised, for use as a decorative substitute for natural wood-logs in an oil-or gas-burning fireplace or stove. In this kind of burning equipment, wood is not required as a combustible and must even be avoided. However, it is often required that such an oil-or gas-burning fireplace or stove looks like its wood-burning homolog, thereby making it necessary to use "fake logs".

An example of such a non-combustible, decorative fire-log intended to be used in combination with combustible synthetic fire-logs is disclosed in U.S. Pat. No. 5, 118,539 issued on Jun. 2nd, 1992 to D. SEBBY et al. Usually, such non-combustible fire-logs are made of cement and refractory aggregates or ceramic fibers, and have a density as high as 120 to 160 lbs/ft$^3$.

U.S. Pat. No. 5,271,888 issued on Dec. 21, 1993 to W. SINSLEY discloses "an improved process and partible mold for forming a lightweight synthetic ceramic log for use in natural gas, propane and wood-burning fireplaces and stoves which are both fully-vented and non-vented depending upon the particular design of the heat generating equipment".

In this process, the log is produced by vacuum forming using, as starting material, a mixture of aluminosilicate fibers (viz.ceramic fibers) and chromite dispersed into water, to which is added a flocculating composition including starch possessing a negative charge to facilitate solid formation, and a colloidal silica/sol possessing a positive charge to improve the adherence of the fibers to each other and thus to improve the handling properties of the resulting molded log. Thanks to the chromite component and to other mineral pigments that can be added to the composition, the log that is so-produced has a bark-like exterior surface and a dark color that make it particularly useful to simulate a natural looking arrangement of real wood-logs in an aesthetically-appealing oil-or gas-burning environment.

A major problem with all the existing non-combustible, synthetic fire-logs known to the present inventors is that they are made of, or include ceramic fibers, the use of which is more and more subject to stringent environmental regulations because of the dust that is generated by these fibers in the ambient atmosphere.

Another problem with some of the non-combustible synthetic fire-logs known in the art is that their density is very high (more than 100 lbs/ft$^3$), thereby making the resulting logs very heavy and difficult to handle in bulk.

A further problem with some other non-combustible, synthetic fire-logs known in the art, is that they generate soot and do not have the same glowing aspect in use as the corresponding natural wood-logs.

Still another problem with most of the existing, non-combustible, synthetic fire-logs known in the art is that they infer with the flame coming from the gas or oil burner and prevent completion of the combustion, thereby resulting in the release of dangerous, unwanted carbon monoxide in the ambient atmosphere.

SUMMARY OF THE INVENTION

In accordance with the present invention, it has surprisingly been discovered that, if use is made, as starting material, of a lightweight mineral foam like the one disclosed and claimed in U.S. Pat. No. 5,360,771 issued on Nov. 1st, 1994, one may produce decorative, non-combustible synthetic fire-logs which do not suffer from any of the problems listed hereinabove.

Thus, the present invention provides a decorative, non-combustible, synthetic fire-log for use in a gas-or oil-burning fireplace or stove. This synthetic fire-log has a low density ranging from 15 to 45 lb/ft$^3$, and is made by pouring a mineral foam into a mold shaped as a natural wood-log and letting this foam harden in the mold to form the synthetic fire-log prior to unmolding the same and letting it dry.

The foam that is used as starting material in the molding process comprises 1 part by weight of a solution of phosphoric acid in which polyvinyl alcohol is dissolved in such an amount as to make the solution viscous; from 0.03 to 6 parts by weight of wollastonite containing from 0.5 to 4% by weight of a carbonate salt; and from 0.2 to 10 parts by weight of water, the amount of water depending on the concentration of the solution of phosphoric acid and on the required density of the resulting synthetic fire-log, it being understood that the more concentrated is the solution of phosphoric acid or the lower is the required density, the higher is the amount of water.

Advantageously, the synthetic fire-log according to the invention may also comprise up to 10 parts of one or more pigments to give a natural wood-like aspect to the synthetic fire-log and up to 10 parts by weight of non-polluting reinforcing additive such as glass fibers, both of these parts being expressed per 100 parts of wollastonite.

The synthetic fire-log that is so-obtained is lightweight. It looks like a natural wood-log and has the same glowing aspect in use. It does not contain any ceramic fibers and does not generate soot. Moreover, it ensures a full combustion of the gas or oil fed into the fireplace or stove, thereby resulting in a substantial reduction in the amount of carbon monoxide released in the atmosphere.

As already indicated hereinabove, the mineral foam that is used as starting material is known in the art. As is disclosed in U.S. Pat. No. 5,360,771, this foam and the products made from the same have very good mechanical characteristics and can be used up to 1,200AC. Accordingly, the synthetic fire-logs according to the invention may easily withstand the temperatures encountered in most of the oil-and gas-burning equipments available on the market.

It has also been found that the fire-logs according to the invention can easily withstand the rapid thermal changes that are encountered in a fireplace or stove without being subject to cracking or breaking.

DETAILED DESCRIPTION OF THE INVENTION

As is indicated hereinabove, the mineral foam used as starting material for the manufacture of the synthetic fire-logs according to the invention, is poured into molds shaped as natural wood-logs.

In practice, use can be made of a flexible, silicone-based mold that can be of any desired shape. Thus, for example, the mold can be devised to produce fire-logs that look like natural wood-logs, cut branches, timber knots, barks, partially consumed logs, etc. . . Because of its expanding property, the foam used as starting material may fill any kind of cavities in the mold, thereby making it possible to achieve any desired finish and sharp angled profiles.

As is disclosed in U.S. Pat. No. 5,360,771, the mineral foam used as starting material can be prepared by heating a solution of phosphoric acid of a given concentration such as 85%, and dissolving polyvinyl alcohol into the heated solution in such an amount as to make it viscous. Separately, wollastonite containing from 0.5 to 4% by weight of a carbonate salt is mixed with from 0.2 to 10 parts by weight of water and the reinforcing additive and pigments where are used if desired and whose amount may vary depending on the consumer's requirements for a given strength and/or color. Finally, 1 part of the solution of phosphoric acid in which is dissolved polyvinyl alcohol is contacted with the mixture of wollastonite. Such contact causes phosphoric acid to react with the wollastonite and the carbonate which is converted into gaseous $CO_2$ to form the foam.

Preferably, use can be made of the wollastonite sold under the trademark NYAD 400 e, which contains about 1.8% by weight of calcium carbonate in its natural state. It must be understood however that use can also be made of wollastonite to which carbonate is added.

When use is made of wollastonite NYAD 400 e which contains calcium carbonate in its natural state, use can also be made of 0 to 6.6 parts by weight to wollastonite like the one sold under the trademark NYAD G e, which contains traces of $CaCO_3$ only, in order to adjust the density of the final product.

After a hardening period of 5 to 30 minutes which is quite fast and permits short production cycles, the synthetic fire-logs can be unmolded and allowed to dry.

If desired, the fire-logs that are so-obtained or part of them can also be externally colored or decorated with a mineral paint resistant to heat.

Tests carried out by the inventors have shown that the so-produced synthetic fire-logs keep their original aspect and good mechanical properties over a very long period of time (more than one year in use).

These tests have also shown that the synthetic fire-logs according to the invention have, in use, a glowing aspect, which makes them very similar to natural wood logs. No soot is generated, even when the fire-logs are in direct contact with the hot point of the flame generated by the gas-or oil-burner(s).

These tests have further shown that, by nature, the mineral foam used for the manufacture of the synthetic fire-logs according to the invention allow for a complete combustion of the gas or oil and air mixture fed into the nozzles of the burner(s), and thus reduce to traces only the amount of CO left in the combustion gas exiting the fireplace or stove.

EXAMPLE

Proceeding as disclosed in example 1(b) of U.S. Pat. No. 5,360,771, a mineral foam having a density of 16 lb/ft$^3$ was prepared from:

0.364 kg of 85% concentrated phosphoric acid $H_3PO_4$;

36.4 g of polyvinyl alcohol (PVA) fibers of trademark AIRVOL 540S sold by PRODUITS CHIMIQUES ST-LAURENT;

0.975 kg of wollastonite of trademark NYAD 400 sold by NYCO;

0.325 kg of wollastonite of trademark NYAD G sold by NYCO;

2 kg of water;

25 g of 12 mm long glass fibers of grade 303 sold by FIBERGLASS CANADA;

55 g of red iron oxide sold by PRESCOTT; and 25 g of green chromium oxide sold by PRESCOTT.

The phosphoric acid, the PVA and a small amount of 95% $H_2SO_4$ were mixed with a small amount of water in a mixer for up to 20 minutes. The remaining elements together with another small amount of 95% $H_2SO_4$ were mixed in another mixer, in which the solution of phosphoric acid previously prepared was subsequently introduced and stirred. The resulting composition was quickly poured into vibrating, log-shaped molds made of silicone of tradename RTV 3110 (Dow corning), as is known in the art. After 15 to 25 minutes, the resulting synthetic fire-logs were unmolded and dried at 90 to 100AC in an oven.

These fire-logs were then tested into a high efficiency, natural gas burning fireplace of tradename SRGH 36R sold by CHEMINIÉES SÉCURITÉ LTÉE of Laval, Québec (see Canadian laid-open patent application No. 2,059,573 published on Jul. 18, 1993).

More particularly, a set of four fire-logs manufactured as disclosed hereinabove was inserted into this fireplace which is designed to generate 25,000 BTU per hour in use.

With such a commercial fireplace, it is possible to adjust the ratio of CO to $CO_2$ produced by the gas burner so as to obtain a flame having a very hot blue part at the bottom and a higher, yellow part of lower temperature. The respective sizes of the blue and yellow parts of the flame are essential to achieve good visual aspect in use.

The main problem with such an adjustment of the ratio of CO to $CO_2$ is that there are some regulations both in Canada and the United States, which determine the maximum concentration of CO that is permitted in a gas burner. According to the Canadian Standard CGA 2:17 and the U.S. Standards ANSI Z.21.50 the maximum amounts of CO allowed in the combustion gas exiting a fireplace are as follows:

a) 25 ppm in a sample of the flue gases obtained during normal operations or if the sample obtained is over 25 ppm, 0.04 per cent in an air-free sample of the flue gases obtained; and b) 40 ppm in a sample of the flue gases obtained during abnormal operations or if the sample obtained is over 40 ppm, 0.06 per cent in an air-free sample of the flue gases.

In accordance with the invention, it has been found that if the synthetic fire-logs according to the invention are properly positioned within the fireplace so that the blue part of the flame is in contact with the logs, a glowing aspect very similar to the one encountered with natural wood-logs is achieved.

It was also found that there is no deposit of soot onto the logs.

Moreover, it was found that the position of the flame in contact with the logs is in perpetual motion.

It was further found that by properly adjusting the blue and yellow portions of the flame, one may properly adjust the aesthetic aspect of the fireplace. More importantly, it was found that such a variation in the aesthetic aspect is obtained whatever be the selected adjustment of the CO to $CO_2$ ratio flame, and, in all cases, the maximum concentration of CO allowed by the above mentioned Standards is met.

The very same results were also obtained with a similar fireplace equipped with a propane gas burner.

COMPARATIVE EXAMPLE

By way of comparison, the very same fireplace as mentioned hereinabove was tested with a set of four synthetic fire-logs made in the very same molds, but with a refractory hydraulic cement. These comparative fire-logs have a weight that was 4 to 5 times higher than the one of the fire-logs according to the invention.

In operation, it was found that if the flame in contact with these comparative fire-logs, there was a deposit of soot and the maximum concentration of CO set by the above mentioned Standards could not be met.

We claim:

1. A decorative, non-combustible, synthetic fire-log for use in a gas or oil burning fireplace or stove, said synthetic fire-log having a density ranging from 15 to 45 $lb/ft^3$ and being made by:

pouring into a mold shaped as a natural wood-log, a mineral foam comprising:

(a) 1 part by weight of a solution of phosphoric acid in which polyvinyl alcohol is dissolved in such an amount as to make said solution viscous;

(b) from 0.03 to 6 parts by weight of wollastonite containing from 0.5 to 4% by weight of a carbonate salt; and (c) from 0.2 to 10 parts by weight of water, said amount of water depending on the concentration of said solution of phosphoric acid and on the required density of the resulting synthetic fire-log, it being understood that the more concentrated is the solution of phosphoric acid or the lower is the required density, the higher is the amount of water;

letting said foam harden in said mold to form said synthetic fire-log;

unmolding the so-formed synthetic fire-log; and letting it dry.

2. The synthetic fire-log of claim 1, wherein said mineral foam also comprises:

(d) up to 10 parts of at least one mineral pigment per 100 parts of wollastonite, said pigment being selected to give a natural wood-like aspect to said synthetic fire-log.

3. The synthetic fire-log of claim 2, wherein said at least one mineral pigment is selected from the group consisting of red-colored iron oxide, green-colored chromium oxide and their mixtures.

4. The synthetic fire-log of claim 1, wherein said mineral foam further comprises:

(e) up to 10 parts of a reinforcing additive per 100 parts of wollastonite.

5. The synthetic fire-log of claim 4, wherein said reinforcing additive consists of glass fibers.

6. The synthetic fire-log of claim 1, wherein aid mineral foam also comprises:

(d) up to 10 parts of glass fibers; and (e) up to 10 parts of at least one mineral pigment selected to give a natural wood-like aspect to said fire-log;

both of said parts (d) and (e) being expressed per 100 parts of said wollastonite (b).

7. The synthetic fire-log of claim 6, wherein the amount of water (c) is selected so that said fire-log has a density ranging from 25 and 35 $lb/ft^3$.

* * * * *